(12) United States Patent
Zheng et al.

(10) Patent No.: US 12,267,027 B2
(45) Date of Patent: Apr. 1, 2025

(54) APPARATUS AND METHOD FOR SIMULATING LINE RUNNING STATE OF MAGNETIC LEVITATION (MAGLEV)

(71) Applicant: Southwest Jiaotong University, Chengdu (CN)

(72) Inventors: Jun Zheng, Chengdu (CN); Yanxing Cheng, Chengdu (CN); Long Kou, Chengdu (CN); Huan Huang, Chengdu (CN); Zhihao Ke, Chengdu (CN); Zigang Deng, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 721 days.

(21) Appl. No.: 17/555,895

(22) Filed: Dec. 20, 2021

(65) Prior Publication Data

US 2022/0115965 A1 Apr. 14, 2022

(30) Foreign Application Priority Data

Oct. 27, 2021 (CN) .......................... 202111257653.4

(51) Int. Cl.
*H02N 15/00* (2006.01)
*B60L 13/06* (2006.01)
*B60L 13/10* (2006.01)
*B61B 13/08* (2006.01)

(52) U.S. Cl.
CPC .............. *H02N 15/00* (2013.01); *B60L 13/06* (2013.01); *B61B 13/08* (2013.01); *B60L 13/10* (2013.01)

(58) Field of Classification Search
CPC ......... H02N 15/00; B60L 13/06; B60L 13/10; B61B 13/08
See application file for complete search history.

(56) References Cited

U.S. PATENT DOCUMENTS

| | | | | |
|---|---|---|---|---|
| 11,552,580 | B1 * | 1/2023 | Zheng | B60L 13/04 |
| 11,725,925 | B1 * | 8/2023 | Deng | H02N 15/00 |
| | | | | 702/170 |
| 12,065,040 | B2 * | 8/2024 | Zhang | B60L 13/10 |
| 2022/0115965 | A1 * | 4/2022 | Zheng | H02N 15/00 |

(Continued)

FOREIGN PATENT DOCUMENTS

| | | | |
|---|---|---|---|
| CN | 1963421 A | * | 5/2007 |
| CN | 106671823 A | * | 5/2017 |
| CN | 106809251 A | | 6/2017 |

(Continued)

*Primary Examiner* — Jason C Smith

(57) ABSTRACT

This application relates to simulation equipment, and more particularly to an apparatus and method for simulating a line running state of magnetic levitation. The apparatus includes a levitation-guidance mechanism, a moving mechanism and a magnetic guideway fluctuation simulated mechanism. The levitation-guidance mechanism is configured to detect a force on a single Dewar of a maglev train to be simulated. The moving mechanism is configured to move the levitation-guidance mechanism. The magnetic guideway fluctuation simulated mechanism is arranged below the levitation-guidance mechanism, and is configured to apply a variable force to the levitation-guidance mechanism. The variable force is configured to simulate a constantly-variable electromagnetic force applied to the levitation-guidance mechanism by a real track.

6 Claims, 1 Drawing Sheet

(56) References Cited

U.S. PATENT DOCUMENTS

| | | | |
|---|---|---|---|
| 2023/0160782 A1* | 5/2023 | Deng | B60L 13/06 104/281 |
| 2024/0230475 A1* | 7/2024 | Wu | G01M 17/10 |

FOREIGN PATENT DOCUMENTS

| | | | | |
|---|---|---|---|---|
| CN | 110356243 A | * | 10/2019 | |
| CN | 110617930 B | | 1/2021 | |
| CN | 113500920 A | * | 10/2021 | |
| WO | WO-2023061997 A1 | * | 4/2023 | B60L 13/04 |

\* cited by examiner

APPARATUS AND METHOD FOR SIMULATING LINE RUNNING STATE OF MAGNETIC LEVITATION (MAGLEV)

CROSS-REFERENCE TO RELATED APPLICATIONS

This application claims the benefit of priority from Chinese Patent Application No. 202111257653.4, filed on Oct. 27, 2021. The content of the aforementioned application, including any intervening amendments thereto, is incorporated herein by reference.

TECHNICAL FIELD

This application relates to maglev simulation equipment, and more particularly to an apparatus and method for simulating a line running state of magnetic levitation.

BACKGROUND

The existing system for simulating the operation of the high-temperature superconducting (HTS) flux-pinning maglev train on a real track line under an uneven magnetic field is operated by means of the relative motion between a large-mass and irregular rotating magnetic track device and a fixed Dewar. Therefore, these simulation systems are generally limited by a large volume and low operation speed.

SUMMARY

To overcome the above-mentioned defects in the prior art, an apparatus and method for simulating a line running state of magnetic levitation are provided herein.

The technical solutions of the disclosure are described below.

In a first aspect, the disclosure provides an apparatus for simulating a line running state of magnetic levitation, comprising:
  a levitation-guidance mechanism;
  a moving mechanism; and
  a magnetic guideway fluctuation simulated mechanism;
  wherein the levitation-guidance mechanism is configured to detect a force applied to a single Dewar of a maglev train to be simulated; the moving mechanism is configured to move the levitation-guidance mechanism; the magnetic guideway fluctuation simulated mechanism is arranged below the levitation-guidance mechanism, and is configured to apply a variable force to the levitation-guidance mechanism; and the variable force is configured to simulate a constantly-variable electromagnetic force applied to the single Dewar of the maglev train to be simulated by a real track.

In an embodiment, the magnetic guideway fluctuation simulated mechanism comprises a permanent magnet guideway and a magnetic field changing mechanism; and the magnetic field changing mechanism is configured to change a magnetic field above and on both sides of the permanent magnet guideway.

In an embodiment, the magnetic field changing mechanism comprises a first magnetic field changing mechanism and a second magnetic field changing mechanism; the first magnetic field changing mechanism is configured to change a magnetic induction line density above the permanent magnet guideway; and the second magnetic field changing mechanism is configured to change a magnetic induction line density at both sides of the permanent magnet guideway.

In an embodiment, the first magnetic field changing mechanism comprises a plurality of excitation strips; the plurality of excitation strips are arranged on a top of the permanent magnet guideway; each of the plurality of excitation strips comprises a coil bracket and a plurality of winding units; and the plurality of winding units are connected end to end along an axial direction of the coil bracket.

In an embodiment, the second magnetic field changing mechanism comprises two excitation strips; the two excitation strips are separately provided on both side walls of the permanent magnet guideway; each of the two excitation strips comprises a coil bracket and a plurality of winding units; and the plurality of winding units are connected end to end along an axial direction of the coil bracket.

In an embodiment, the levitation-guidance mechanism comprises a test Dewar, a plurality of superconducting bulks, a fixing plate, and a force measuring rack; the test Dewar is arranged above the magnetic guideway fluctuation simulated mechanism; the plurality of superconducting bulks are arranged in a cavity of the test Dewar, and are distributed uniformly on a bottom of the cavity along an axial direction of the test Dewar; the fixing plate is arranged on a top of the test Dewar; the force measuring rack is arranged above the fixing plate; four corners of the force measuring rack are respectively connected to four corners of the fixing plate via a connecting pin; and the connecting pin is provided with a strain gauge force sensor.

In an embodiment, the fixing plate is detachably arranged on the top of the test Dewar; and each side wall of the test Dewar is provided with a plurality of acceleration sensors.

In an embodiment, the moving mechanism comprises a longitudinal moving mechanism, a transverse moving mechanism, a vertical moving mechanism and a support frame; the transverse moving mechanism is arranged on the longitudinal moving mechanism; the longitudinal moving mechanism is configured to drive the transverse moving mechanism to move longitudinally; the vertical moving mechanism is arranged on the transverse moving mechanism; the transverse moving mechanism is configured to drive the vertical moving mechanism to move transversely; the vertical moving mechanism is provided with the support frame, and is configured to drive the support frame to move upward and downward; and an end of the support frame away from the vertical moving mechanism is fixedly connected to the levitation-guidance mechanism.

In an embodiment, the longitudinal moving mechanism comprises a longitudinal slide rail and a longitudinal motor; the transverse moving mechanism comprises a transverse slide rail and a transverse motor; the vertical moving mechanism comprises a vertical slide rail and a vertical motor; the longitudinal motor is arranged on an end of the longitudinal slide rail; the transverse slide rail is slidably arranged on the longitudinal slide rail; the bottom of the transverse slide rail is connected to an output shaft of the longitudinal motor; the transverse slide rail is perpendicular to the longitudinal slide rail; the vertical slide rail is slidably arranged on the transverse slide rail; the bottom of the vertical slide rail is connected to an output end of the transverse motor; the vertical motor is arranged on a top of the vertical slide rail; the support frame is arranged on the vertical slide rail; and an output shaft of the vertical motor is connected to an end of the support frame.

In a second aspect, the present disclosure provides a method for simulating a line running state of magnetic levitation based on the above apparatus, comprising:

feeding liquid nitrogen to a test Dewar to cool a superconducting bulk to a superconducting state in a magnetic field such that the test Dewar is levitated above a permanent magnet guideway;

introducing a preset undulating current to a plurality of winding units in each of a plurality of excitation strips such that the test Dewar generates a vibration for simulating vibration of the single Dewar during high-speed running of a maglev train; and at the same time, receiving a dynamic acceleration monitoring data sent from a plurality of acceleration sensors arranged on each side wall of the test Dewar; wherein the preset undulating current is a current that constantly changes in intensity and direction over time; and the dynamic acceleration monitoring data is an acceleration value detected by the plurality of acceleration sensors;

after a preset period of time, stopping receiving the dynamic acceleration monitoring data; wherein the preset period of time is a duration that the preset undulating current segment is introduced into the plurality of winding units;

controlling the moving mechanism to move a fixing plate to a top of the test Dewar; and fixedly connecting the fixing plate to the top of the test Dewar; and introducing the preset undulating current to the plurality of winding units in each of the plurality of excitation strips again such that the test Dewar is subjected to a variable force; and at the same time, receiving a static force monitoring data sent from a plurality of strain gauge force sensors arranged on a connecting pin; wherein the variable force is configured to simulate the constantly-variable electromagnetic force applied to the single Dewar of the maglev train by a magnetic guideway during high-speed running; and the static force monitoring data is a tension value or pressure value detected by each of the plurality of strain gauge force sensors.

Compared to the prior art, the present disclosure has the following beneficial effects.

In the simulation apparatus provided herein, a magnetic guideway fluctuation simulated device is arranged below the test Dewar to replace the traditional large-mass rotating mechanism, and at the same time, the intensity, direction, and frequency of the current flowing into the magnetic guideway fluctuation simulated device are adjusted to simulate the bump and force conditions of the maglev train at different running speeds.

The other features and advantages of the present disclosure will be described in the subsequent description. Moreover, parts of the features and advantages are apparent in the description or can be understood through the implementation of the embodiment of the present disclosure. Objects and other advantages of the disclosure can be realized and acquired by means of the structure specified in the description, claims, and drawings.

BRIEF DESCRIPTION OF THE DRAWINGS

To render the technical solutions of the embodiment of the present disclosure clearer, the drawings required in the embodiments will be briefly described below. It should be understood that presented in the following drawings are merely some embodiments of the present disclosure, and are not to limit the scope of the present disclosure. For those of ordinary skill in the art, other drawings can be obtained based on the drawings disclosed herein without paying any creative effort.

Figure 1:
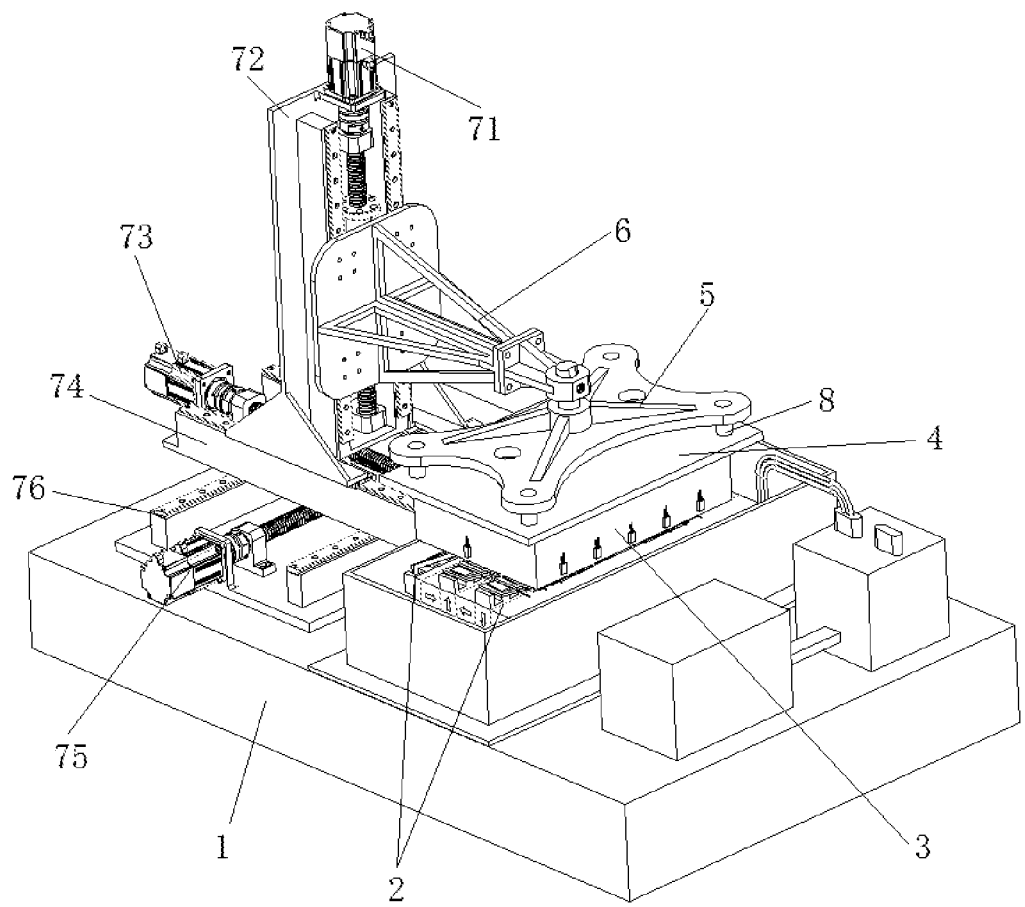
FIG. 1 schematically shows a structure of an apparatus for simulating a line running state of magnetic levitation according to an embodiment of the present disclosure.

In the drawings, 1, base; 2, magnetic guideway fluctuation simulated mechanism; 21, permanent magnet guideway; 22, excitation strip; 221, coil bracket; 222, winding unit; 3, test Dewar; 31, superconducting bulk; 4, fixing plate; 5, force measuring rack; 6, support frame; 71, vertical motor; 72, vertical slide rail; 73, transverse motor; 74, transverse slide rail; 75, longitudinal motor; 76, longitudinal slide rail; and 8, connecting pin.

DETAILED DESCRIPTION OF EMBODIMENTS

To make the object, technical solutions and beneficial effects of the disclosure clearer, the present disclosure will be described in detail below with reference to the accompanying drawings and embodiments. Obviously, described below are merely some embodiments of the present disclosure, which are not intended to limit the disclosure. The components described and shown in the drawings can be arranged and designed in a variety of configurations. Therefore, the following detailed descriptions of the embodiments of the present disclosure presented in the drawings are not intended to limit the protection scope of the present disclosure, but merely represent the selected embodiments of the present disclosure. Based on the embodiments of the present disclosure, other embodiments obtained by those of ordinary in the art without paying any creative effort shall fall within the protection scope of the present disclosure.

It should be noted that similar labels and letters in the following drawings represent similar items. Therefore, once an item has been defined in a figure, it does not need to further define and explain this item in the subsequent figures. At the same time, as used herein, the terms "first" and "second" are merely used for distinguishment and cannot be understood as indicating or implying relative importance.

Embodiment 1

As shown in FIG. 1, an apparatus for simulating a line running state of magnetic levitation is provided, which includes a levitation-guidance mechanism, a moving mechanism, and a magnetic guideway fluctuation simulated mechanism.

The levitation-guidance mechanism is configured to detect a simulated force on a single Dewar of a high-temperature superconductivity (HTS) pinning maglev train.

As shown in FIG. 1, the train body levitation guidance device provided herein includes a test Dewar 3, a fixing plate 4 arranged on the test Dewar 3, and a force measuring rack arranged above the fixing plate 4. Four corners of the fixing plate 4 are respectively connected to four corners of the force measuring rack 5 via connecting pins. Each connecting pin is provided with a strain gauge force sensor.

The strain gauge force sensor is configured to detect the force condition of the four corners of the test Dewar 3, and then indirectly calculate the vibration fluctuation of the test Dewar 3.

The moving mechanism is configured to move the levitation-guidance mechanism.

As shown in FIG. 1, the moving mechanism provided herein includes a vertical motor 71, a vertical slide rail 72, a transverse motor 73, a transverse slide rail 74, a longitudinal motor 75, and a longitudinal slide rail 76. The moving mechanism is fixedly connected to the force measuring rack 5 of the levitation-guidance mechanism through a support frame 6.

The vertical motor 71 and the vertical slide rail 72 form a vertical moving mechanism, which is configured to drive the support frame 6 to move upward and downward, and thus drive the levitation-guidance mechanism to move upward and downward.

The transverse motor 73 and the transverse slide rail 74 form a transverse moving mechanism, which is configured to drive the vertical moving mechanism to move transversely on a horizontal plane, and thus drive the levitation-guidance mechanism to move left and right on the horizontal plane.

The longitudinal motor 75 and the longitudinal slide rail 76 form a longitudinal moving mechanism, which is configured to drive the transverse moving mechanism to move back and forth, and thus drive the levitation-guidance mechanism to move back and forth.

In a simulation experiment, the moving mechanism can adjust the position of the levitation-guidance mechanism through the longitudinal moving mechanism, the vertical moving mechanism and the transverse moving mechanism ensure that the levitation-guidance mechanism can be moved to a preset position required in the simulation experiment.

Compared with by moving a magnetic guideway fluctuation simulated mechanism 2 to move the levitation-guidance mechanism, the above-mentioned method is more convenient and has a wider adjustment range.

The magnetic guideway fluctuation simulated mechanism 2 includes a permanent magnet guideway 21 and a magnetic field changing mechanism. The magnetic field changing mechanism is configured to change the magnetic field above and on both sides of the permanent magnet guideway 21, and thus simulate the constantly-variable electromagnetic force applied to the single Dewar of the maglev train by a magnetic guideway during high-speed running.

Figure 2:
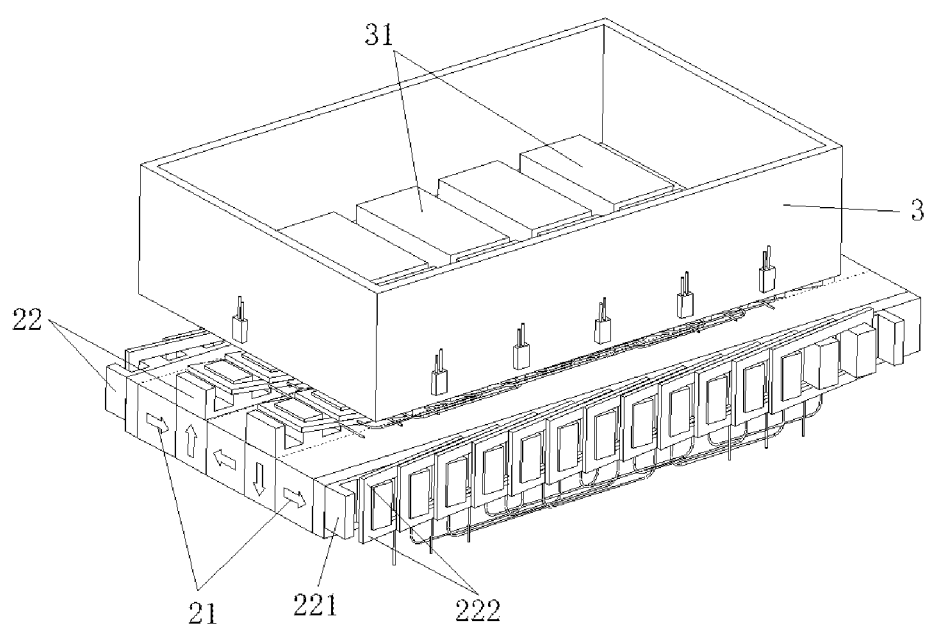
FIG. 2 schematically shows a structure of simulated magnetic guideway fluctuation device according to an embodiment of the present disclosure.

As shown in FIG. 2, the permanent magnet guideway 21 is composed of five square-type permanent magnets. A plurality of excitation strips 22 are respectively arranged on an upper surface and two sides of the permanent magnet guideway 21, and are configured to change a fixed magnetic field strength of the permanent magnet guideway 21, thereby simulating a situation that a high-speed magnetic levitation train runs in an uneven magnetic field of a real rail.

Each of the plurality of excitation strips 22 includes a coil bracket 221 and a plurality of winding units arranged on the coil bracket 221. Each set of the winding unit is controlled independently. During the simulation experiment, the direction and intensity of the current flowing into the winding units 222 of the two excitation strips arranged on a top of the permanent magnet guideway 21 can be controlled to change the magnetic field strength above the permanent magnet guideway 21, and thus change the electromagnetic force applied on the levitation-guidance mechanism from the permanent magnet guideway 21. And at the same time, as the coil bracket is provided with the plurality of winding units and the plurality of winding units are independent, different parts of the levitation-guidance mechanism are subjected to different electromagnetic forces, which simulates the situation in which a single Dewar of the maglev train vibrates under the uneven and violent disturbance of the magnetic field of the magnetic track during high-speed running.

In an embodiment, the magnetic guideway fluctuation simulated mechanism 2 is placed in a container. The container is provided with a large amount of insulated cooling liquid for cooling the magnetic guideway fluctuation simulated mechanism 2.

In an embodiment, the magnetic field changing device includes a first magnetic field changing mechanism and a second magnetic field changing mechanism. The first magnetic field changing mechanism is configured to change a magnetic induction line density above the permanent magnet guideway 21. The second magnetic field changing mechanism is configured to change a magnetic induction line density at both sides of the permanent magnet guideway 21.

In an embodiment, the first magnetic field changing mechanism includes a plurality of excitation strips 22. The plurality of excitation strips are arranged on a top of the permanent magnet guideway 21. Each of the plurality of excitation strips 22 includes a coil bracket and a plurality of winding units, where the plurality of winding units are connected end to end along an axial direction of the coil bracket.

In this embodiment, the direction and intensity of the current flowing into the winding units 222 of the two excitation strips 22 arranged on a top of the permanent magnet guideway 21 can be controlled to change the magnetic field strength above the permanent magnet guideway 21, and thus change the electromagnetic force applied on the levitation-guidance mechanism by the permanent magnet guideway 21. And at the same time, as the coil bracket is provided with the plurality of winding units and the plurality of winding units are independent, different parts of the levitation-guidance mechanism are subjected to different electromagnetic forces. The first magnetic field changing mechanism consists of the two excitation strips 22 arranged on the top of the permanent magnet guideway 21, and is configured to change the force applied on the levitation-guidance mechanism in a vertical direction.

In an embodiment, the second magnetic field changing mechanism includes two excitation strips 22. The two excitation strips 22 are separately provided on both side walls of the permanent magnet guideway 21. Each of the two excitation strips 22 includes a coil bracket and a plurality of winding units. The plurality of winding units are connected end to end along an axial direction of the coil bracket.

In this embodiment, the excitation strips 22 of the second magnetic field changing mechanism is configured to change the magnetic field intensity at both sides of the permanent magnet guideway 21, which can render the simulation effect closer to reality. In actual conditions, the up-and-down movement of the train will change the distance between the bottom of the train and the permanent magnet guideway, which will change the magnetic field intensity both in the middle and two sides of the bottom of the train. In the simulation method provided herein, as the fixing plate 4 is barely moved and the first magnetic field changing mechanism is arranged on the middle of the top of the permanent magnet guideway 21, when the magnetic field intensity of the upper-middle part of the permanent magnet guideway 21 changes, the magnetic field intensity at two sides of the permanent magnet guideway 21 does not change correspondingly, which will distort the simulation. Therefore, the second magnetic field changing mechanism is configured to change the magnetic field intensity at two sides of the permanent magnet guideway 21 with the magnetic field intensity of the upper-middle part of the permanent magnet guideway 21 such that the simulation effect can be better close to reality.

In an embodiment, the levitation-guidance mechanism includes a test Dewar 3, a plurality of superconducting bulks 32, a fixing plate 4, and a force measuring rack 5. The test Dewar 3 is arranged above the magnetic guideway fluctuation simulated mechanism 2. The plurality of superconducting bulks 32 are arranged in a cavity of the test Dewar 3 and are distributed uniformly in a bottom of the cavity along an axial direction of the test Dewar 3. The fixing plate 4 is arranged on a top of the test Dewar 3. The force measuring rack 5 is arranged above the fixing plate 4. Four corners of the force measuring rack 5 are respectively connected to four corners of the fixed plate 4 via connecting pins 8. Each connecting pin 8 is provided with a strain gauge force sensor.

The superconducting bulks 32 can be levitated stably after cooling in the liquid nitrogen such that the test Dewar 3 can be levitated on the permanent magnet guideway 21. The strain gauge force sensors arranged on the connecting pin are configured to detect the forces of the four corners of the test Dewar 3 in real-time, and then calculate the destructive force rejection.

In an embodiment, the fixing plate 4 is detachably arranged on the top of the test Dewar 3. A side wall of the test Dewar is provided with a plurality of acceleration sensors.

A dynamic test method is provided herein, which is described below. The fixing plate 4 is detachably arranged on the top of the test Dewar 3. When the fixing plate 4 is removed, the test Dewar 3 can produce a normal vibration displacement. The simulated dynamic vibration value can be obtained by the acceleration sensor arranged on the side wall of the test Dewar 3. The simulated data of different features can be obtained by static and dynamic simulation of the test Dewar 3, which can facilitate the analysis of the comprehensive evaluation data of the dynamic operating characteristics of the test Dewar 3. In the static simulation, the fixing plate 4 is connected to the test Dewar 3.

In an embodiment, the moving mechanism includes the longitudinal moving mechanism, the transverse moving mechanism, the vertical moving mechanism and the support frame 6. The transverse moving mechanism is arranged on the longitudinal moving mechanism. The longitudinal moving mechanism is configured to drive the transverse moving mechanism to move longitudinally. The vertical moving mechanism is arranged on the transverse moving mechanism. The transverse moving mechanism is configured to drive the vertical moving mechanism to move transversely. The vertical moving mechanism is provided with the support frame 6 and is configured to drive the support frame 6 to move upward and downward. An end of the support frame 6 away from the vertical moving mechanism is connected to the levitation-guidance mechanism.

During the simulation experiment, the moving mechanism can adjust the position of the levitation-guidance mechanism through the longitudinal moving mechanism, the vertical moving mechanism and the transverse moving mechanism ensure that the levitation-guidance mechanism can be moved to a preset position required in the simulation experiment.

Compared with by moving a magnetic guideway fluctuation simulated mechanism 2 to move the levitation-guidance mechanism, the above-mentioned method is more convenient and has a wider adjustment range.

As shown in FIG. 1, the longitudinal moving mechanism provided herein includes a longitudinal slide rail 76 and a longitudinal motor 75. The transverse moving mechanism includes a transverse slide rail 74 and a transverse motor 73. The vertical moving mechanism includes a vertical slide rail 72 and a vertical motor 71. The longitudinal motor 75 is arranged on an end of the longitudinal slide rail 76. The transverse slide rail 74 is slidably arranged on the longitudinal slide rail 76. A bottom of the transverse slide rail 74 is connected to an output shaft of the longitudinal motor 75. The transverse slide rail 74 is vertical to the longitudinal moving mechanism 76. The vertical moving mechanism 72 is slidably arranged on the transverse moving mechanism 74. A bottom of the vertical moving mechanism 72 is connected to an output end of the transverse moving mechanism 74. The vertical motor 71 is arranged on a top of the vertical slide rail 72. The support frame 6 is arranged on the vertical slide rail 72. An output shaft of the vertical motor 71 is connected to an end of the support frame 6.

Embodiment 2

Provided herein is a method for simulating a line running state of magnetic levitation based on the apparatus provided in Embodiment 1, which includes the following steps.

(S1) In the initial moment, the test Dewar 3 is fixed at a certain height through the moving mechanism, and then added with liquid nitrogen such that the plurality of superconducting bulks in the test Dewar 3 is cooled to the superconducting state. In this way, the test Dewar 3 is levitated above the permanent magnet guideway 21, and then separate the moving mechanism from the test Dewar 3. It should be noted that at this time the top of the test Dewar 3 is separated from the fixing plate 4, and can move freely above the permanent magnet guideway 21.

(S2) A plurality of winding units 222 in each of a plurality of excitation strips 22 are introduced with a preset undulating current such that the test Dewar 3 generates a vibration for simulating vibration of the single Dewar during high-speed running of a maglev train, and at the same time, a plurality of dynamic acceleration monitoring data sent from a plurality of acceleration sensors arranged on both side walls of the test Dewar are received, where the preset undulating current is a current that constantly changes in intensity and direction over time; and the dynamic acceleration monitoring data is an acceleration value detected by the plurality of acceleration sensors. The dynamic acceleration monitoring data can be used to study the operating attitude of the train and the amplitude and vibration frequency of the single Dewar in the train during high-speed running.

(S3) After a preset period of time, the plurality of dynamic acceleration monitoring data stops receiving, and at this time, the test Dewar 3 is suspended at rest above the permanent magnet guideway 21, where the first preset time is a duration that the preset undulating current is introduced into the plurality of winding units 222;

(S4) The moving mechanism is controlled to move a fixing plate 4 to a top of the test Dewar 3 and fixedly connecting the fixing plate 4 to the top of the test Dewar 3, so that the relative position between the test Dewar 3 and the permanent magnet guideway 21 remains unchanged in the following steps.

(S5) The plurality of winding units 222 in each of the plurality of excitation strips 22 are filled with the preset undulating current again such that the test Dewar 3 can be subjected to a variable force, and at the same time, a static force monitoring data sent from a plurality of strain gauge force sensors arranged on connecting pins 8 is received, where the variable force is configured to simulate the constantly-variable electromagnetic force applied to the single Dewar of the maglev train by a magnetic guideway during high-speed running of the train; and the static force monitoring data is a tension value or pressure value detected by each of the plurality of strain gauge force sensors. The static force monitoring data can be used to simulate the fatigue characteristics at different parts of the single Dewar in the train during high-speed running, based on that an uneven magnetic field of the magnetic guideway results in different forces in different parts of the single Dewar.

(S6) After the simulation experiment, the running data of the train during high-speed running can be obtained more comprehensively by combining the static force monitoring data and dynamic acceleration monitoring data.

The above-mentioned embodiments are only the preferred embodiments of the present disclosure, and are not intended to limit the present disclosure. For those skilled in the art, the present disclosure may have various replacements and changes. Any modification, equivalent replacement, improvement without departing from the spirit and principles of the present disclosure shall be fall in the protection scope of the present disclosure.

The above-mentioned embodiments are only illustrative of the present disclosure, and are not intended to limit the protection scope of the present disclosure. Any changes or replacements made by those skilled in the art without departing from the scope of the disclosure shall fall within the scope of the present disclosure defined by the appended claims.

What is claimed is:

1. An apparatus for simulating a line running state of magnetic levitation, comprising:
   a levitation-guidance mechanism;
   a moving mechanism; and
   a magnetic guideway fluctuation simulated mechanism;
   wherein the levitation-guidance mechanism is configured to detect a force applied to a single Dewar of a maglev train to be simulated; the moving mechanism is configured to move the levitation-guidance mechanism; the magnetic guideway fluctuation simulated mechanism is arranged below the levitation-guidance mechanism, and is configured to apply a variable force to the levitation-guidance mechanism; and the variable force is configured to simulate a constantly-variable electromagnetic force applied to the single Dewar of the maglev train to be simulated by a real track;
   wherein the magnetic guideway fluctuation simulated mechanism comprises a permanent magnet guideway and a magnetic field changing mechanism; and the magnetic field changing mechanism is configured to change a magnetic field of the permanent magnet guideway;
   the magnetic field changing mechanism comprises a first magnetic field changing mechanism and a second magnetic field changing mechanism; the first magnetic field changing mechanism is configured to change a magnetic induction line density above the permanent magnet guideway; and the second magnetic field changing mechanism is configured to change a magnetic induction line density at both sides of the permanent magnet guideway;
   the first magnetic field changing mechanism comprises a plurality of first excitation strips; the plurality of first excitation strips are arranged on a top of the permanent magnet guideway; each of the plurality of first excitation strips comprises a first coil bracket and a plurality of first winding units; and the plurality of first winding units are connected end to end along an axial direction of the first coil bracket; and
   the second magnetic field changing mechanism comprises two second excitation strips; the two second excitation strips are separately provided on both side walls of the permanent magnet guideway; each of the two second excitation strips comprises a second coil bracket and a plurality of second winding units; and the plurality of second winding units are connected end to end along an axial direction of the second coil bracket.

2. The apparatus of claim 1, wherein the levitation-guidance mechanism comprises a test Dewar, a plurality of superconducting bulks, a fixing plate, and a force measuring rack; the test Dewar is arranged above the magnetic guideway fluctuation simulated mechanism; the plurality of superconducting bulks are arranged in a cavity of the test Dewar, and are distributed uniformly on a bottom of the cavity along a straight line; the fixing plate is arranged on a top of the test Dewar; the force measuring rack is arranged above the fixing plate; four corners of the force measuring rack are respectively connected to four corners of the fixing plate via a plurality of connecting pins; and each of the plurality of connecting pins is provided with a strain gauge force sensor.

3. The apparatus of claim 2, wherein the fixing plate is detachably arranged on the top of the test Dewar; and each side wall of the test Dewar is provided with a plurality of acceleration sensors.

4. The apparatus of claim 1, wherein the moving mechanism comprises a longitudinal moving mechanism, a transverse moving mechanism, a vertical moving mechanism and a support frame; the transverse moving mechanism is arranged on the longitudinal moving mechanism; the longitudinal moving mechanism is configured to drive the transverse moving mechanism to move longitudinally; the vertical moving mechanism is arranged on the transverse moving mechanism; the transverse moving mechanism is configured to drive the vertical moving mechanism to move transversely; the vertical moving mechanism is provided with the support frame, and is configured to drive the support frame to move upward and downward; and an end of the support frame away from the vertical moving mechanism is fixedly connected to the levitation-guidance mechanism.

5. The apparatus of claim 4, wherein the longitudinal moving mechanism comprises a longitudinal slide rail and a longitudinal motor; the transverse moving mechanism comprises a transverse slide rail and a transverse motor; the vertical moving mechanism comprises a vertical slide rail and a vertical motor; the longitudinal motor is arranged on an end of the longitudinal slide rail; the transverse track is slidably arranged on the longitudinal slide rail; a bottom of the transverse slide rail is connected to an output shaft of the longitudinal motor; the transverse slide rail is perpendicular to the longitudinal slide rail; the vertical slide rail is slidably arranged on the transverse slide rail; a bottom of the vertical slide rail is connected to an output end of the transverse motor; the vertical motor is arranged on a top of the vertical slide rail; the support frame is arranged on the vertical slide rail; and an output shaft of the vertical motor is connected to an end of the support frame.

6. A method for simulating the line running state of magnetic levitation based on the apparatus of claim 1, comprising:
   feeding liquid nitrogen to a test Dewar to cool a superconducting bulk to a superconducting state in a magnetic field such that the test Dewar is levitated above the permanent magnetic guideway;

introducing a preset undulating current to the plurality of first winding units in each of the plurality of first excitation strips and the plurality of second winding units in each of the two second excitation strips such that the test Dewar generates a vibration for simulating vibration of the single Dewar during high-speed running of the maglev train; and at the same time, receiving a dynamic acceleration monitoring data sent from a plurality of acceleration sensors arranged on a side wall of the test Dewar; wherein the preset undulating current is a current that constantly changes in intensity and direction over time; and the dynamic acceleration monitoring data is an acceleration value detected by the plurality of acceleration sensors;

after a preset period of time, stopping receiving the dynamic acceleration monitoring data; wherein the preset period of time is a duration that the preset undulating current is introduced into the plurality of first winding units and the plurality of second winding units;

controlling the moving mechanism to move a fixing plate to a top of the test Dewar; and fixedly connecting the fixing plate to the top of the test Dewar; and introducing the preset undulating current to the plurality of first winding units in each of the plurality of first excitation strips and the plurality of second winding units in each of the two second excitation strips again such that the test Dewar is subjected to a variable force; and at the same time, receiving a static force monitoring data sent from a plurality of strain gauge force sensors arranged on a connecting pin; wherein the variable force is configured to simulate the constantly-variable electromagnetic force applied to the single Dewar of the maglev train by a magnetic track during high-speed running; and the static force monitoring data is a tension value or pressure value detected by each of the plurality of strain gauge force sensors.

* * * * *